US011828133B1

(12) United States Patent
Raugstad et al.

(10) Patent No.: US 11,828,133 B1
(45) Date of Patent: Nov. 28, 2023

(54) FOAMED CEMENTING SYSTEM INCLUDING AUTOMATED GAS SUPPLY

(71) Applicants: Odd Egil Raugstad, Rogaland (NO); Ryan Leroux, Oklahoma City, OK (US); Gianluca Ruggieri, Pescara (IT); Bennie J. Lindsey, The Woodlands, TX (US); Gregory Dean, Montgomery, TX (US)

(72) Inventors: Odd Egil Raugstad, Rogaland (NO); Ryan Leroux, Oklahoma City, OK (US); Gianluca Ruggieri, Pescara (IT); Bennie J. Lindsey, The Woodlands, TX (US); Gregory Dean, Montgomery, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/748,348

(22) Filed: May 19, 2022

(51) Int. Cl.
*E21B 33/13* (2006.01)
*E21B 33/138* (2006.01)
(Continued)

(52) U.S. Cl.
CPC .......... *E21B 33/138* (2013.01); *C04B 38/103* (2013.01); *C09K 8/46* (2013.01); *C04B 2111/00146* (2013.01)

(58) Field of Classification Search
CPC .................. E21B 33/138; C09K 8/46
(Continued)

(56) References Cited

U.S. PATENT DOCUMENTS

| 4,300,633 A | 11/1981 | Stewart |
| 4,512,405 A * | 4/1985 | Sweatman ............. C09K 8/516 166/308.1 |

(Continued)

FOREIGN PATENT DOCUMENTS

| CN | 109751012 A | 5/2019 |
| CN | 111206901 A | 5/2020 |
| CN | 111773989 A | 10/2020 |

OTHER PUBLICATIONS

Notification of Transmittal of the International Search Report and Written Opinion for PCT/US2023/020523 dated Aug. 17, 2023, 11 pp.

*Primary Examiner* — Zakiya W Bates
*Assistant Examiner* — Ashish K Varma
(74) *Attorney, Agent, or Firm* — CANTOR COLBURN LLP (57) ABSTRACT

A system for cementing a borehole with foamed cement includes a gas delivery assembly mounted on a movable support structure, the gas delivery assembly configured to supply a gas to a cement slurry to generate a foamed cement slurry. The gas delivery assembly includes a heating element in thermal communication with a gas supply, a temperature sensor, a pressure sensor, a flow meter, and an automated control valve in fluid communication with the gas supply. The gas delivery assembly also includes a control module including a processing device configured to control a temperature and a flow rate of the gas supplied to the cement slurry based on a desired flow rate and measurements from the temperature sensor, the pressure sensor and the flow meter.

20 Claims, 8 Drawing Sheets

(51) Int. Cl.
*C04B 38/10* (2006.01)
*C09K 8/46* (2006.01)
*C04B 111/00* (2006.01)

(58) Field of Classification Search
USPC .......................................................... 166/292
See application file for complete search history.

(56) References Cited

U.S. PATENT DOCUMENTS

| | | | |
|---|---|---|---|
| 10,927,288 B2* | 2/2021 | Haydon | C04B 24/2652 |
| 2013/0213647 A1* | 8/2013 | Roddy | E21B 47/10 |
| | | | 166/310 |
| 2014/0238665 A1* | 8/2014 | Welker | E21B 33/14 |
| | | | 166/242.9 |
| 2021/0379540 A1 | 12/2021 | Pang et al. | |

* cited by examiner

FOAMED CEMENTING SYSTEM INCLUDING AUTOMATED GAS SUPPLY

BACKGROUND

Foamed cementing operations are performed in various contexts, such as providing borehole integrity and zonal isolation. Foamed cementing can be used, for example, to shut off shallow water or gas flows and in applications with narrow pore pressure windows.

SUMMARY

An embodiment of a system for cementing a borehole with foamed cement includes a gas delivery assembly mounted on a movable support structure, the gas delivery assembly configured to supply a gas to a cement slurry to generate a foamed cement slurry. The gas delivery assembly includes a heating element in thermal communication with a gas supply, a temperature sensor, a pressure sensor, a flow meter, and an automated control valve in fluid communication with the gas supply. The gas delivery assembly also includes a control module including a processing device configured to control a temperature and a flow rate of the gas supplied to the cement slurry based on a desired flow rate and measurements from the temperature sensor, the pressure sensor and the flow meter.

An embodiment of a method of cementing a borehole with foamed cement includes receiving a gas at a gas delivery assembly mounted on a movable support structure, the gas delivery assembly including a heating element in thermal communication with a gas supply, a temperature sensor, a pressure sensor, a flow meter, an automated control valve in fluid communication with the gas supply, and a control module. The method also includes controlling a temperature and a flow rate of the gas based on a desired flow rate and measurements from the temperature sensor, the pressure sensor and the flow meter, and outputting the gas according to the temperature and the flow rate to a cement slurry foam generating assembly for generation of a foamed cement slurry.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Apparatuses, systems and methods are provided for performing foamed cementing operations or aspects thereof An embodiment of a foamed cementing system includes a gas delivery assembly configured to supply a gas (e.g., nitrogen gas) from a gas supply to a cement fluid for generating a foamed cement slurry. The gas supply includes, for example, one or more pressurized nitrogen gas cylinders. The foamed cement slurry may be injected into a borehole as part of a foamed cementing operation. The gas delivery assembly includes an automated control valve and a control module configured to control the automated valve to control the volume and flow rate of gas delivered to the cement fluid. The gas delivery assembly, in an embodiment, includes additional components to facilitate control of gas delivery, such as a heating device, sensors (e.g., a flow meter, temperature sensor, pressure sensor, etc.), fluid lines and additional valves.

One or more components of the gas delivery system (e.g., control valve, heater and/or control module) may be mounted on a support structure, such as a moveable skid. The moveable skid may be part of a foamed cementing system that includes various assemblies, such as a cement mixing assembly or cement slurry pumping assembly for generating a cement fluid or slurry. The cementing system may also include a cement slurry foam generating assembly for mixing a delivered amount of gas with the cement slurry to generate a foamed cement slurry, and/or for injecting the foamed cement slurry into a borehole. One or more of the assemblies may also be mounted on respective skids or other moveable support structures.

Embodiments described herein present a number of advantages. Embodiments reduce the amount of equipment needed as compared to conventional foam cementing systems. For example, the gas delivery assembly can be used in conjunction with nitrogen gas containers (e.g., cylinders) instead of larger and heavier cryogenic nitrogen tanks, which eliminates the need for a nitrogen pumping system that is a part of typical conventional foamed cementing systems. In addition, as the gas delivery assembly can be mounted on a moveable skid or other support structure, the gas delivery assembly can be easily moved as desired. Embodiments thus can present fewer logistical costs, provide for increased configurability, require less equipment and personnel, provide a smaller footprint and reduce risks as compared to conventional systems.

Typical foamed cementing operations include a significant number of operators and involve heavy equipment that can take a significant amount of space, such as cryogenic tanks and pump equipment. This can be a challenge in limited space environments, such as offshore platforms. Embodiments maintain the characteristics of conventional operations while also reducing the footprint of a foamed cementing system.

Figure 1:
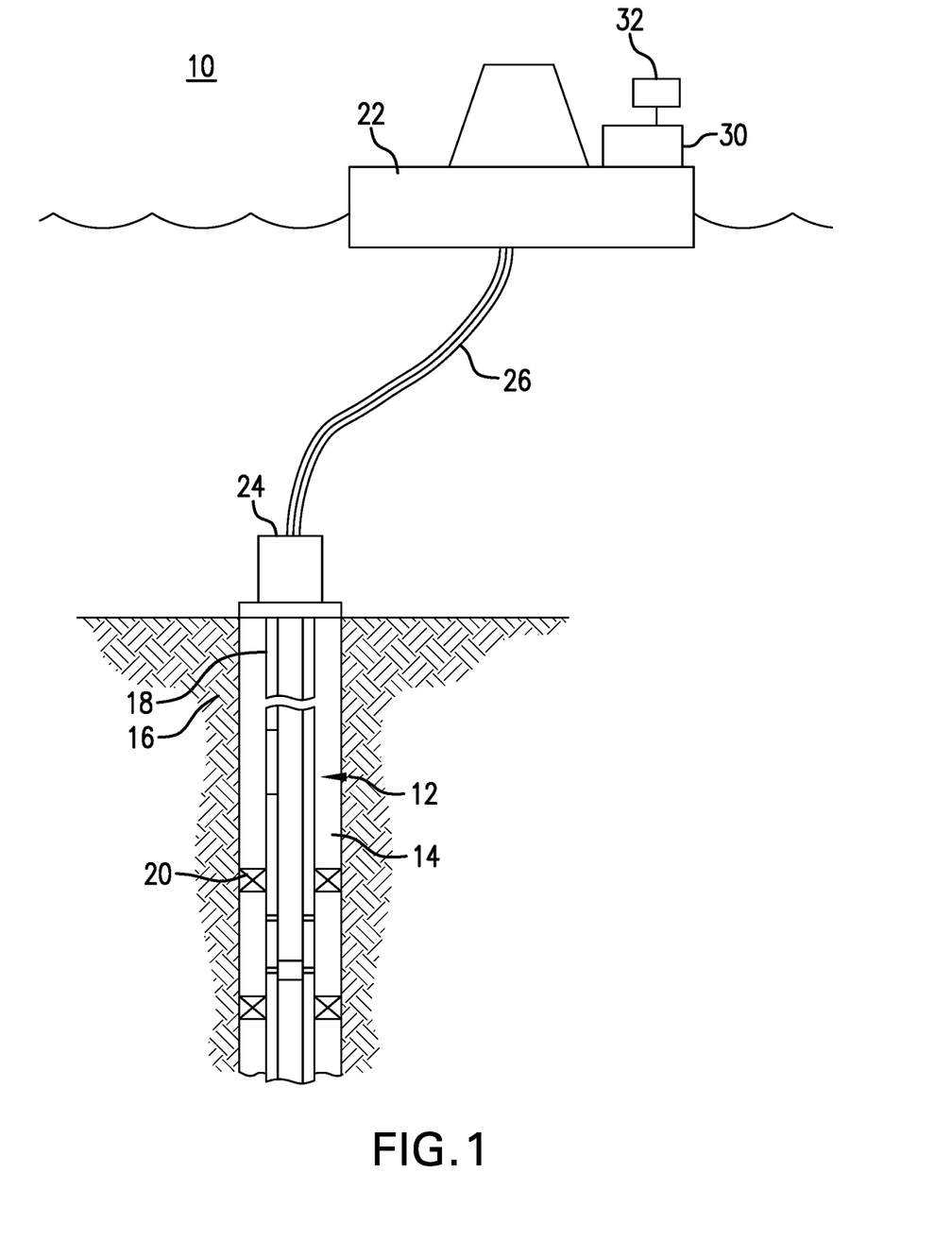
FIG. 1 illustrates an embodiment of a system for performing subterranean operations, the system including a foamed cementing system.

FIG. 1 depicts an embodiment of a system 10 configured to perform subterranean operations, such as resource or energy exploration and/or production (e.g., oil and gas production, geothermal energy production, etc.), carbon sequestration and others. The system 10 includes a borehole string 12 configured to be disposed in a borehole 14 that extends into a subterranean region or a resource bearing formation, such as at least one subterranean region 16, such as an earth formation. The borehole 14 may be an open hole, a cased hole or a partially cased hole. The borehole string 12 includes a tubular 18, such as a pipe (e.g., multiple pipe segments) or coiled tubing, that extends from a wellhead at a surface location (e.g., at a drill site or as part of an offshore system). The borehole string may be configured as a wireline tool, coiled tubing, a drillstring or a LWD string. The borehole string may include various components, such as packers 20, a bottomhole assembly, sensor devices, flow control devices and others.

In an embodiment, the system 10 is configured to perform operations in a subsea environment, i.e., an environment where an earth formation is located under a body of water. For example, the system 10 includes a surface facility 22 such as one or more platforms and/or marine vessels, which is connected to a subsea wellhead 24. The wellhead 24, downhole components and/or subsea components are connected to the surface facility 22 via one or more risers 26. Although embodiments are described herein in the context of subsea systems, they are not so limited. The devices, systems and methods described herein may be incorporated in land-based systems and operations.

The system 10 includes a cementing system 30 that is configured to inject a foamed cement slurry into the borehole 14. Aspects of cementing methods discussed herein may be performed by a processing device 32, which may be included as part of the cementing system or a separate device connected thereto. For example, the processing device 32 is configured as a control system for controlling aspects of cementing operations, and may be in communication with various processing devices or control modules of components of the cementing system (e.g., a control module of the gas delivery assembly as described further herein).

Figure 2:
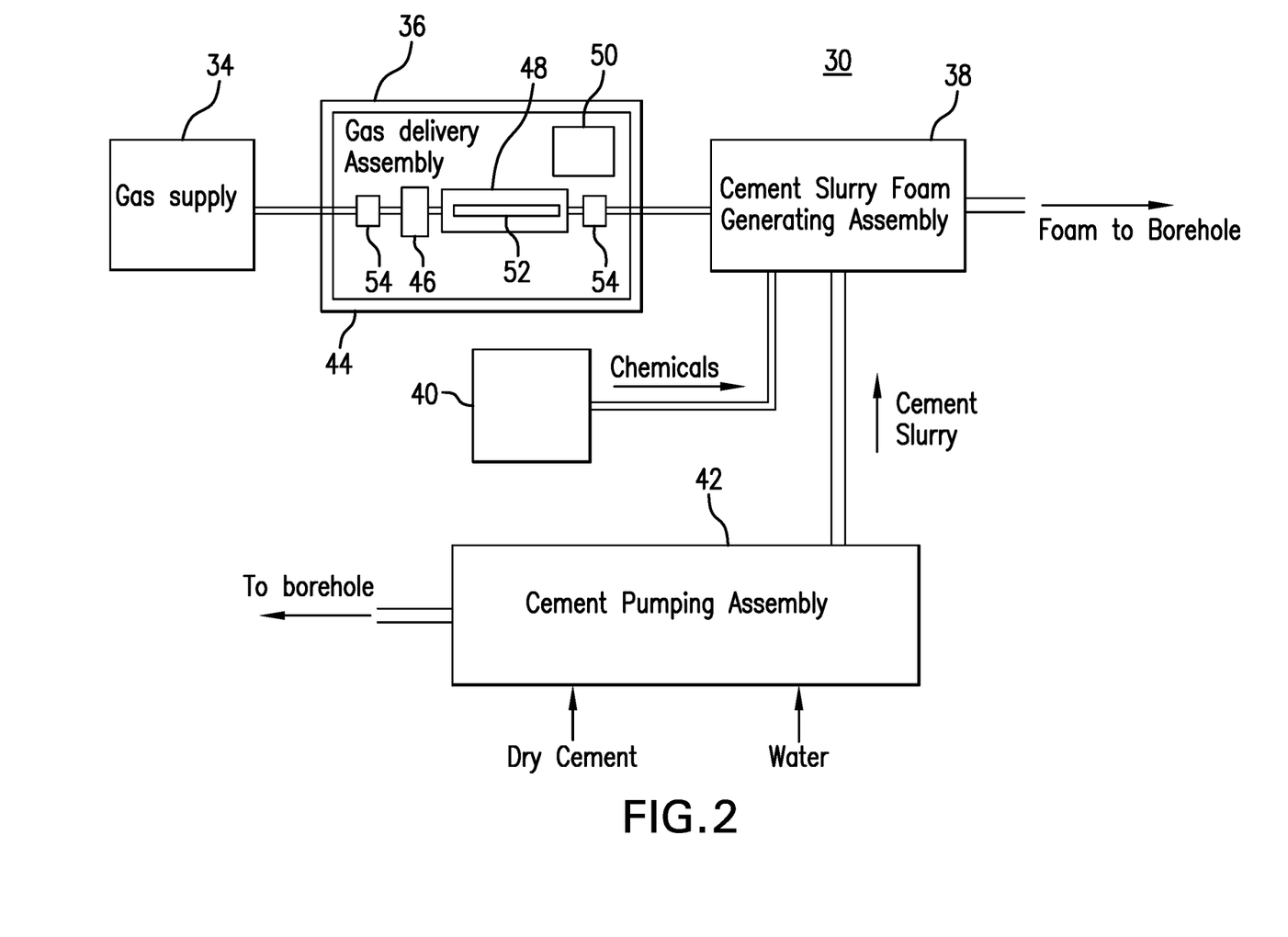
FIG. 2 depicts components of an embodiment of a foamed cementing system.

FIG. 2 depicts an embodiment of the cementing system 30, which includes various components for performing aspects of foamed cementing. One or more of the components may be mounted on moveable skids or other moveable support structures.

The cementing system 30 includes a gas supply 34, a gas delivery assembly 36, a cement slurry foam generating assembly 38, an additive assembly 40, and a cement slurry pumping assembly 42. The cementing system 30 may include fewer assemblies than that shown, and may include other assemblies not shown in FIG. 2.

The gas supply 34, in an embodiment, provides nitrogen gas that is mixed with cement to generate a foamed cement slurry. Other suitable gases may be used to create the foamed cement slurry. The additive assembly 40 is configured to add one or more desired additives to the slurry. For example, an additive liquid may be injected to stabilize the foam cement, which is integrated into the slurry after mixing. The additive may be included to achieve desired densities and rheologies.

The cement slurry foam generating assembly 38 mixes or combines a cement fluid or slurry (mixture of cement and water, for example) with gas provided by the gas delivery assembly 36, and may also inject the resulting foamed cement slurry with a desired pressure and flow rate into the borehole 14. The cement slurry pumping assembly 42 mixes or combines a cement powder with water to form the cement slurry. The cement slurry is subsequently pumped under pressure to the cement slurry foam generating assembly 38 where the cement slurry is mixed with gas provided by the gas delivery assembly 36. The cement pumping assembly 42 along with the nitrogen gas supply 34 may be configured to provide the pressure to inject the slurry with a desired pressure and flow rate into the borehole 14.

The gas delivery assembly 36 includes various components for controlling parameters of supplied gas, such as temperature, pressure, volume, flow rate and others. All or some of the components may be mounted on a moveable support structure 44, such as a moveable skid.

In an embodiment, the gas delivery assembly 36 includes an automated flow control valve 46 and an in-line heating device or heater 48, one or more of which are controlled by a control module 50 mounted on the support structure 44 or on another assembly not shown. The automated flow control valve 46, in an embodiment, is a pneumatic valve that includes a pneumatic actuator controlled by the control module 50 to regulate the flow of gas through the gas delivery assembly 36. The heater 48 includes a heating element 52 for heating gas flowing through a flow line in the heater 48. For example, the heater 48 includes a coiled flow line that surrounds the heating element 52. The automated control valve 46 and the heater 48 allow for the use of gaseous nitrogen containers, for example, by reducing or eliminating unstable flows at lower flow rates (e.g., below about 150 standard cubic feet per minute), and reducing or eliminating freezing issues at higher flow rates (e.g., above about 400 standard cubic feet per minute). Various sensors 54, such as flow sensors, pressure sensors, temperature sensors and/or others, may be included.

Figure 3:
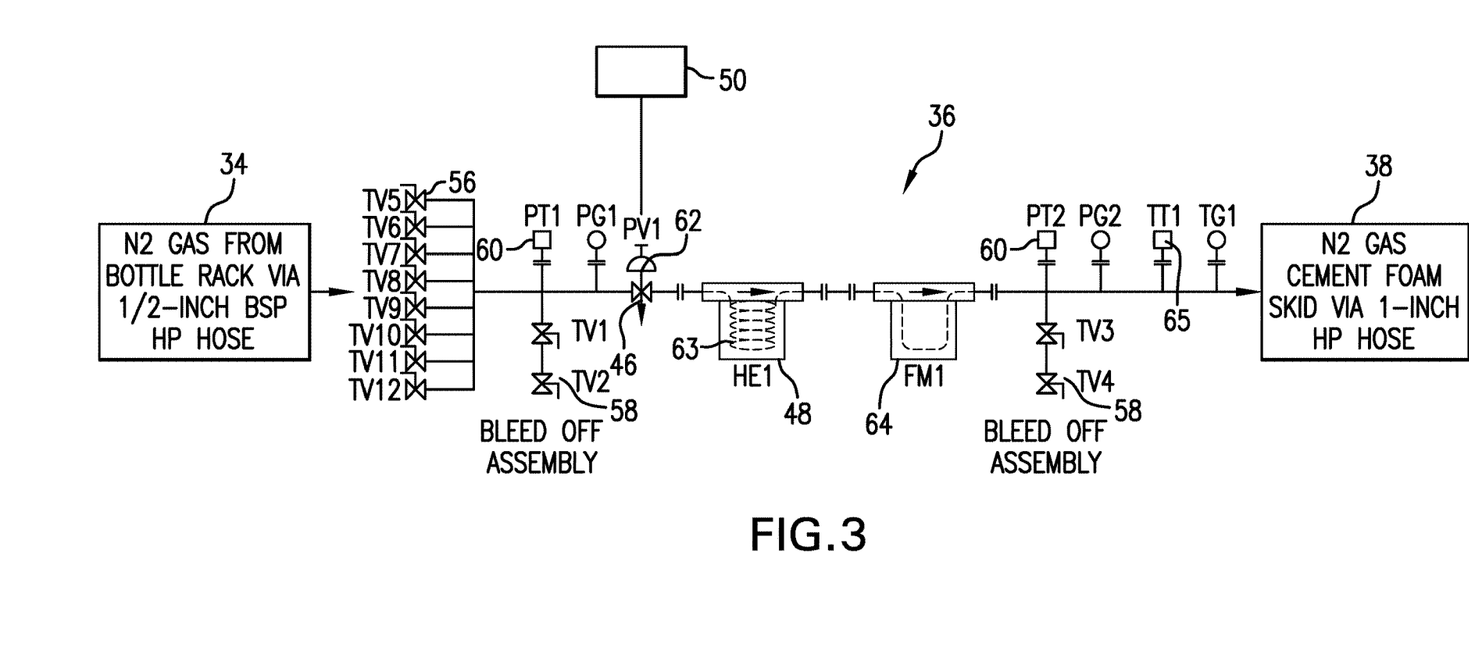
FIG. 3 is a schematic depiction of an embodiment of a gas delivery assembly of the foamed cementing system of FIG. 2.

FIG. 3 schematically depicts an embodiment of the gas delivery assembly 36. In this embodiment, gas is supplied from a plurality of pressurized gas containers, each having a respective valve 56 (e.g., shutoff valve). Each valve 56 may be operated manually, or controlled by a processing device such as the control module 50 or processing device 32. The gas supply 34 is not so limited and can be any desired configuration. For example, the gas containers may be connected to a single valve 56.

Gas from the containers flows past a bleed off assembly 58 and a pressure transducer 60 to the flow control valve 46. Bleed off assemblies remain closed except when bleeding off system pressure, e.g., after use and during storage. In this embodiment, the flow control vale 46 includes a pneumatic actuator 62 that is controlled by the control module 50. The flow control valve 46 is in fluid communication with the inline heater 48, which includes a coiled flow line 63 and a heating element.

Heated gas flows to a flow meter 64 and then past another bleed off assembly 58. Another pressure transducer 60 and a temperature transducer 65 provide pressure and temperature measurements as a feedback to the control module 50, which can adjust flow parameters by controlling the pneumatic actuator 62 and inline heater 48. Flow parameters may be adjusted based on desired temperature and flow rate provided by an operator, and/or transmitted to the control module 50 from another processing device (e.g., a control unit in the cement slurry foam generating assembly 38 and/or the processing device 32). The heated gas is then fed at a desired pressure, temperature and flow rate to the cement slurry foam generating assembly 38.

It is noted that the gas delivery assembly 36 is not limited to the specific configuration shown in FIG. 3. For example, the gas delivery assembly 36 may have additional components or fewer components, and the components shown can be arranged in any suitable manner along the flow path of the gas.

Figure 4:
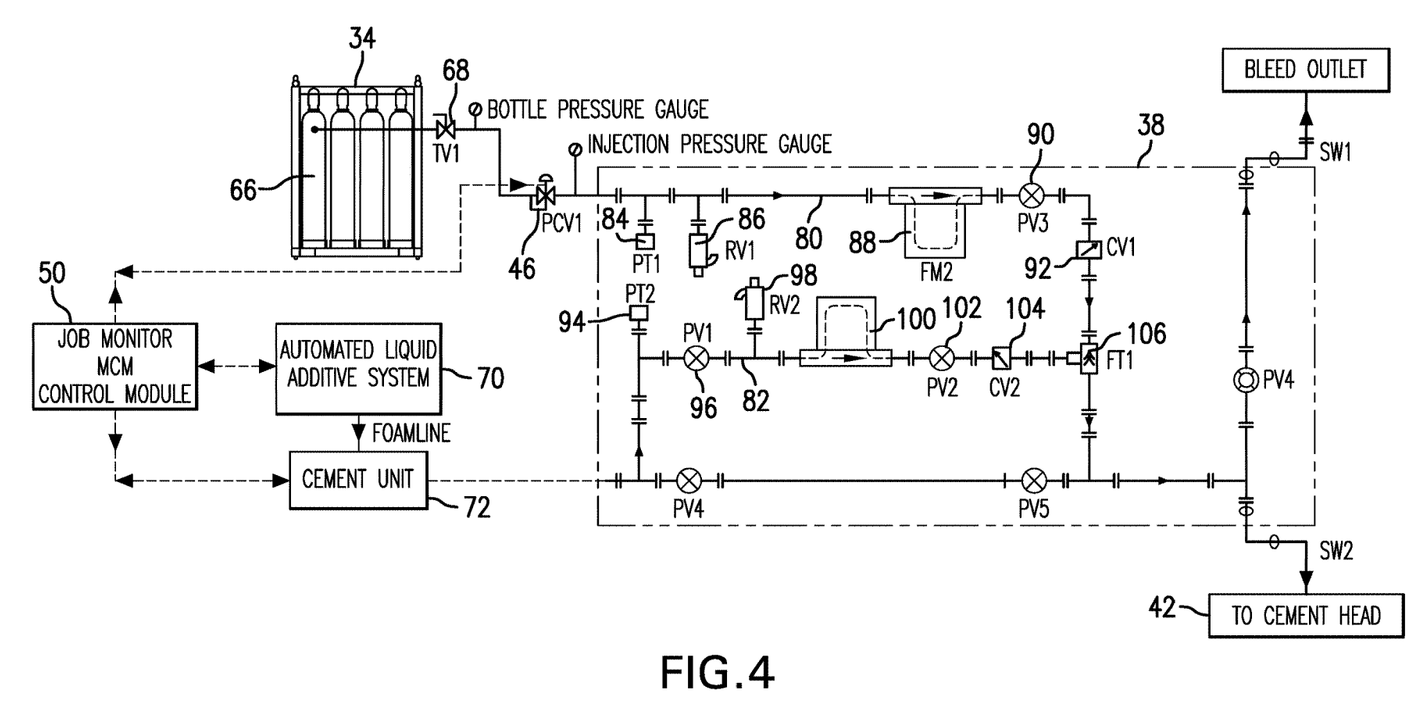
FIG. 4 is a schematic depiction of components of the foamed cementing system of FIG. 2.

FIG. 4 schematically depicts an example of components of the cementing system 30 and illustrates communication and interaction between the control module 50 and other components. In this example, the gas supply 34 includes a plurality of nitrogen gas containers 66 coupled to the flow control valve 46 via a shutoff valve 68.

The control module 50 communicates in this example with a controller or processor 70 of the additive assembly 40 and a cement unit 72 that provides a cement fluid to the cement slurry foam generating assembly 38.

The cement slurry foam generating assembly 38 includes a first flow line 80 through which nitrogen gas or other suitable gas is provided from the gas delivery assembly 36

(via the automated control valve 46), and a second flow line 82 through which a cement slurry is provided. The first flow line 80 is connected to components in series, such as a pressure transducer 84, a relief valve 86, a flow meter 88, a plug valve 90 and a check valve 92.

The second flow line 82 is connected to components such as a pressure transducer 94, a plug valve 96, a relief valve 98, a flow meter 100, a plug valve 102 and a check valve 104. Gas and the cement fluid are mixed in a foam tee 106, and the resulting foamed slurry is transmitted to the borehole.

Figure 5:
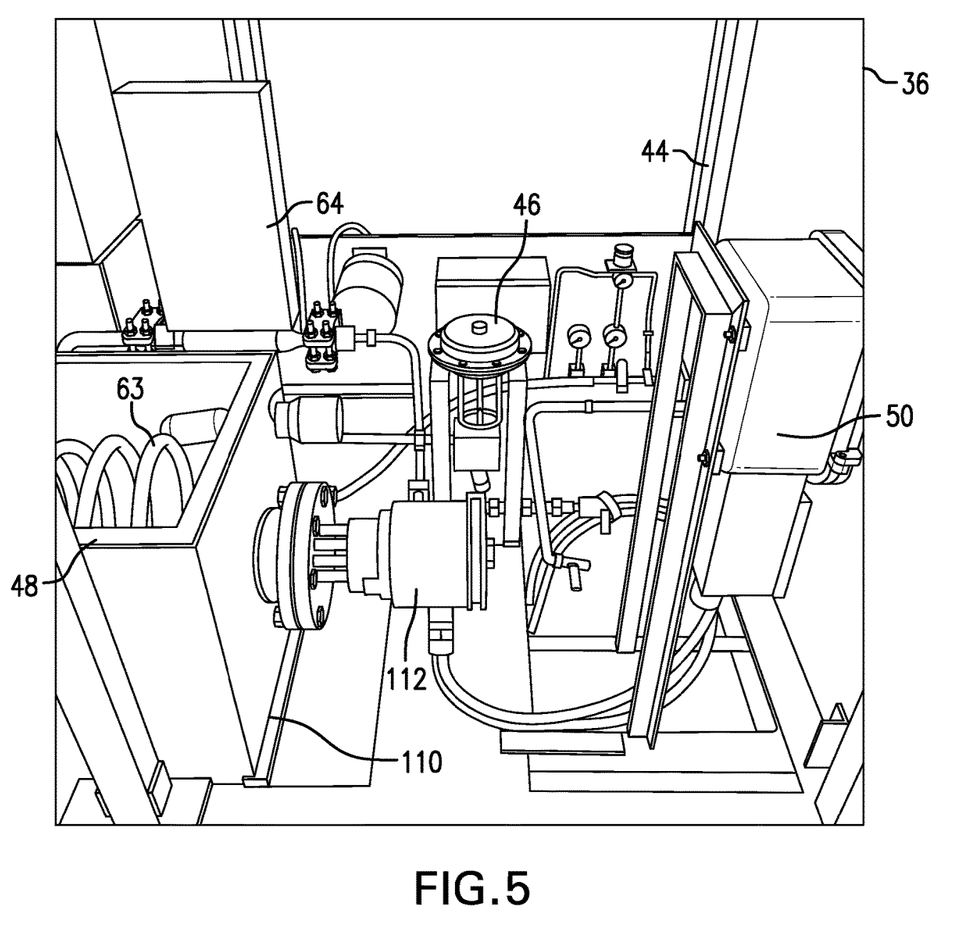
FIG. 5 depicts an example of a gas delivery assembly including a moveable support structure.
Figure 6:
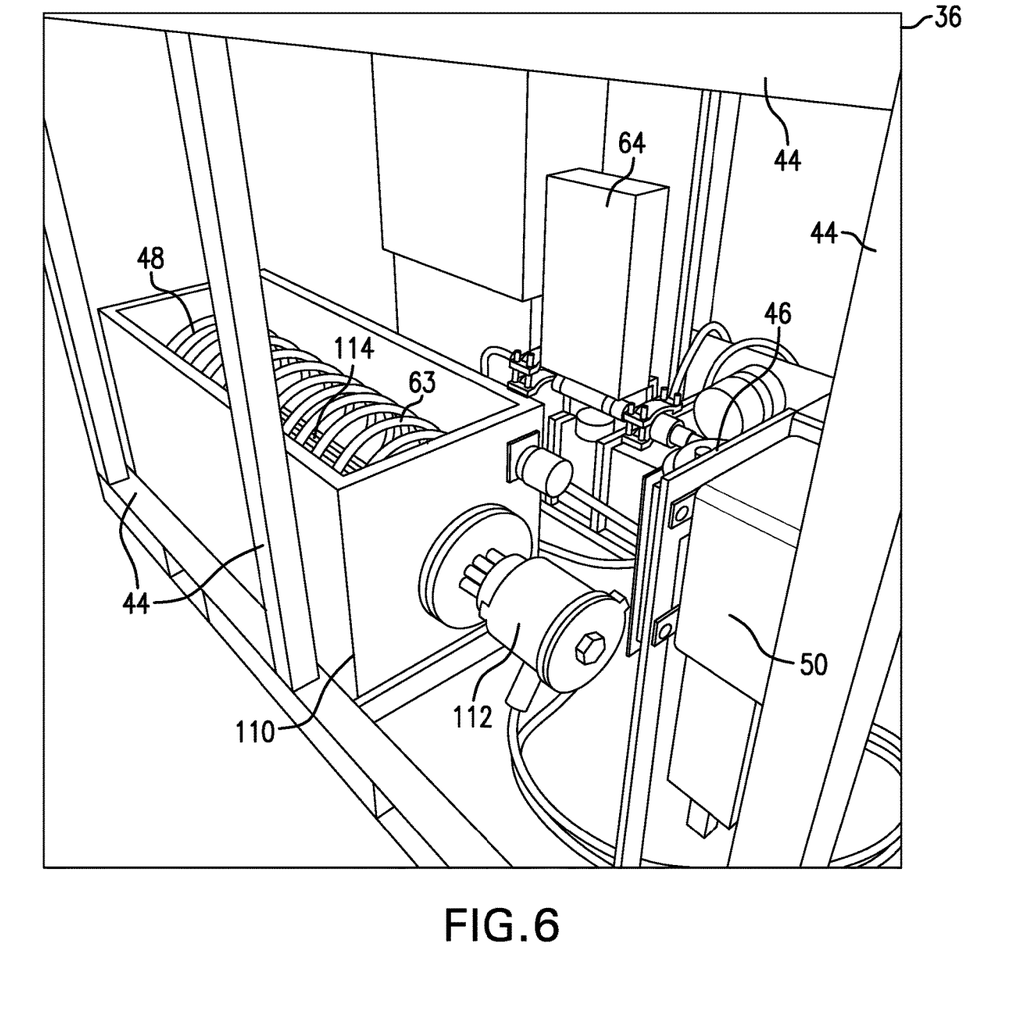
FIG. 6 depicts the gas delivery assembly of FIG. 5.

FIGS. 5 and 6 are perspective views of an embodiment of the gas delivery assembly 36. In this embodiment, the moveable support structure 44 is a skid made from a tubular steel frame. The frame supports the control module 50, the heater 48, the flow meter 64 and other sensors (e.g., pressure and temperature sensors) and the automated flow control valve 46. Gas is supplied to the heater 48, which in this embodiment includes a housing 110 that supports a heating device 112, a heating element 114 and the coiled flow line 63. The heater 48 may be any in-line heater or heat exchanger.

Figure 7:
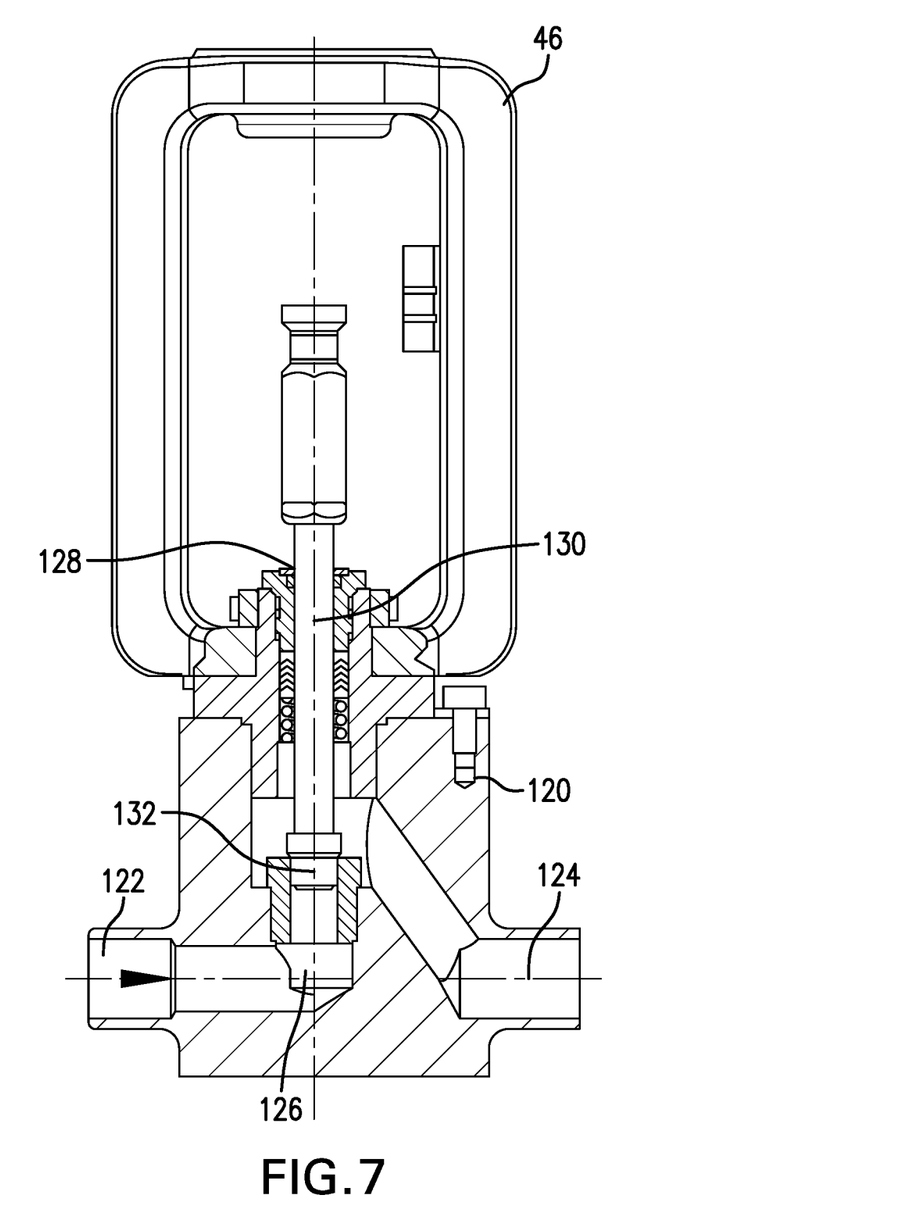
FIG. 7 depicts an example of an automated flow control valve.

In an embodiment, the flow control valve 46 is a pneumatic valve that includes a pneumatic actuator. FIG. 7 is a side cross-sectional view of an example of the pneumatic valve. The valve 46 includes a valve body 120 that includes an inlet 122 for receiving gas (e.g., flowing out of the heater), an outlet 124 for flowing gas to the cement slurry foam generating assembly 38, and a valve seat 126. The valve seat 126 in this example is a globe-style or parabolic seat, although other configurations may be used (e.g., flat seat, angle seat, etc.). The valve 46 also includes a pneumatic actuator 128 having an actuator member 130 and a valve plug 132 that can be moved vertically to control the flow rate of gas through the valve 46. The valve size (i.e., diameter of the inlet and/or valve seat) may be of any suitable size. For example, the valve size may be ½ inch, which is capable of allowing for flow rates as low as about 30 standard cubic feet per inch in conjunction with the parabolic seat design. In other examples, the valve size can be ¾ inch or one inch.

Figure 8:
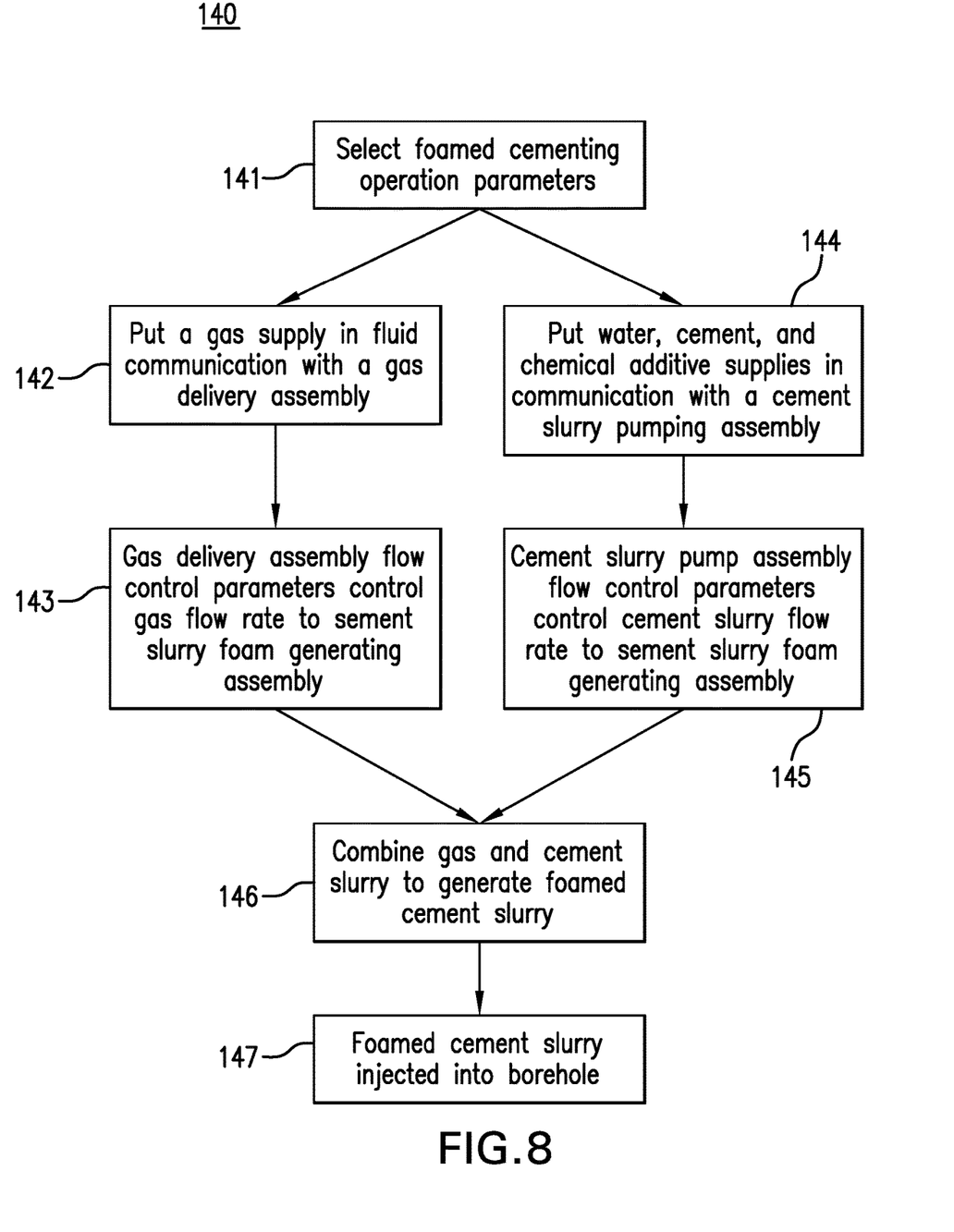
FIG. 8 is a flow diagram depicting an embodiment of a method of cementing a section or portion of a borehole.

FIG. 8 illustrates an embodiment of a method 140 of cementing a borehole and/or injecting a foamed cement into a subterranean region. Aspects of the method 140 may be performed by a processor or processors, exclusively or in combination with a human operator or operators. For example, at least part of the method 140 may be performed by the control module 50.

The method 140 includes a number of steps or stages represented by blocks 141-147. The method 140 is not limited to the number or order of steps therein, as some steps represented by blocks 141-147 may be performed in a different order than that described below, or fewer than all of the steps may be performed.

At block 141, desired foamed cementing parameters are selected. Examples of parameters include density, cement type, concentrations of additives (if any), flow rate and others.

At block 142, the gas delivery assembly 36 is put into fluid communication with a gas supply, such as a plurality of pressurized nitrogen gas containers. For example, one or more valves are open to allow nitrogen gas to flow from one or more pressurized nitrogen gas containers to the gas delivery assembly 36.

At block 143, gas delivery parameters are determined, for example, based on the selected foamed cementing parameters. For example, a desired density of the foamed cement slurry is used to determine a selected flow rate of gas to be delivered by the gas delivery assembly 36. The control module 50 may determine the selected flow rate, or an operator or other processing device may provide the selected flow rate to the control module 50. Based on the selected flow rate, the temperature and flow rate of nitrogen gas is controlled via the automated flow control valve 46. A flow of gas with the desired flow rate and temperature is supplied to cement slurry foam generating assembly 38. The control module may control the temperature and flow rate of the gas supplied to the cement slurry based on desired flow rates of the gas and/or desired flow rates of the cement slurry (which may be supplied in real-time) and measurements from a temperature sensor, pressure sensor and flow meter.

At block 144, water, cement and optionally one or more chemical additives are put in fluid communication with the cement slurry pumping assembly 42. The water, cement and optional chemical additive(s) are combined to generate a cement slurry.

At block 145, the cement slurry is provided to the cement slurry foam generating assembly 38 for combination into a foamed cement slurry. Flow control parameters, such as a cement slurry flow rate, are controlled by the cement slurry pumping assembly 42. It is noted that blocks 144 and 145 may be performed concurrently or simultaneously with blocks 142 and 143, or in any order with respect to blocks 142 and 143.

At block 146, the flow of gas outputted from the gas delivery assembly 36 is combined with the cement slurry, and optionally the one or more additives, to generate the foamed cement slurry.

At block 147, the foamed cement slurry is then injected into a borehole 44.

Set forth below are some embodiments of the foregoing disclosure:

Embodiment 1: A system for cementing a borehole with foamed cement, comprising: a gas delivery assembly mounted on a movable support structure, the gas delivery assembly configured to supply a gas to a cement slurry to generate a foamed cement slurry, the gas delivery assembly including: a heating element in thermal communication with a gas supply; a temperature sensor and a pressure sensor; a flow meter; an automated control valve in fluid communication with the gas supply; and a control module including a processing device configured to control a temperature and a flow rate of the gas supplied to the cement slurry based on a desired flow rate and measurements from the temperature sensor, the pressure sensor and the flow meter.

Embodiment 2: The system of any prior embodiment, wherein the gas is nitrogen gas.

Embodiment 3: The system of any prior embodiment, wherein the processing device is configured to control the temperature and the flow rate based on a selected flow rate of the foamed cement slurry and a selected density of the foamed cement slurry.

Embodiment 4: The system of any prior embodiment, wherein the gas is supplied to the gas delivery assembly in a gaseous state by one or more containers configured to retain the gas in the gaseous state at a selected pressure.

Embodiment 5: The system of any prior embodiment, wherein the gas delivery assembly is configured to dynamically heat and choke the gas supplied by the one or more containers to control the temperature, pressure and the flow rate.

Embodiment 6: The system of any prior embodiment, wherein the automated control valve includes a pneumatic valve device coupled to a pneumatic actuator.

Embodiment 7: The system of claim 1, wherein the gas delivery assembly is in fluid communication with a cement slurry foam generating assembly configured to combine the gas with the cement slurry to generate the foamed cement slurry.

Embodiment 8: The system of any prior embodiment, wherein the cement slurry foam generating assembly is configured to receive the cement slurry from a cement slurry pumping assembly, the cement slurry foam generating assembly configured to inject the foamed cement slurry into the borehole.

Embodiment 9: The system of any prior embodiment, wherein at least one of the cement slurry foam generating assembly and the cement slurry pumping assembly is disposed at a respective moveable support structure.

Embodiment 10: The system of any prior embodiment, wherein the support structure is a moveable skid configured to be disposed at a land-based or offshore rig.

Embodiment 11: A method of cementing a borehole with a foamed cement, comprising: receiving a gas at a gas delivery assembly mounted on a movable support structure, the gas delivery assembly including a heating element in thermal communication with a gas supply, a temperature sensor, a pressure sensor, a flow meter, an automated control valve in fluid communication with the gas supply, and a control module; controlling a temperature and a flow rate of the gas based on a desired flow rate and measurements from the temperature sensor, the pressure sensor and the flow meter; and outputting the gas according to the temperature and the flow rate to a cement slurry foam generating assembly for generation of a foamed cement slurry.

Embodiment 12: The method of any prior embodiment, further comprising injecting the foamed cement slurry into a borehole.

Embodiment 13: The method of any prior embodiment, wherein the gas is nitrogen gas.

Embodiment 14: The method of any prior embodiment, wherein the temperature and the flow rate is controlled based on a selected flow rate of the foamed cement slurry and a selected density of the foamed cement slurry.

Embodiment 15: The method of any prior embodiment, wherein the gas is supplied to the gas delivery assembly in a gaseous state by one or more containers configured to retain the gas in the gaseous state at a selected pressure.

Embodiment 16: The method of any prior embodiment, wherein controlling the temperature and the flow rate includes dynamically heating and choking the gas supplied by the one or more containers to control the temperature, the pressure and the flow rate.

Embodiment 17: The method of any prior embodiment, wherein the automated control valve includes a pneumatic valve device coupled to a pneumatic actuator.

Embodiment 18: The method of any prior embodiment, wherein the gas is output to a cement slurry foam generating assembly configured to combine the gas with the cement slurry to generate the foamed cement slurry.

Embodiment 19: The method of any prior embodiment, wherein the cement slurry foam generating assembly is configured to receive the cement slurry from a cement slurry pumping assembly, the cement slurry foam generating assembly configured to inject the foamed cement slurry into the borehole.

Embodiment 20: The method of any prior embodiment, wherein at least one of the cement slurry foam generating assembly and the cement slurry pumping assembly is disposed at a respective moveable support structure.

In support of the teachings herein, various analysis components may be used, including a digital and/or an analog system. For example, embodiments such as the system 10, the cementing system 30, downhole tools, hosts and network devices described herein may include digital and/or analog systems. Embodiments may have components such as a processor, storage media, memory, input, output, wired communications link, user interfaces, software programs, signal processors (digital or analog), signal amplifiers, signal attenuators, signal converters and other such components (such as resistors, capacitors, inductors and others) to provide for operation and analyses of the apparatus and methods disclosed herein in any of several manners well-appreciated in the art. It is considered that these teachings may be implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and the like do not denote a particular order, but are used to distinguish different elements.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for cementing a borehole with foamed cement, comprising:
 a gas delivery assembly mounted on a movable support structure, the gas delivery assembly configured to supply a gas to a cement slurry to generate a foamed cement slurry, the gas delivery assembly including:

a heating element in thermal communication with a gas supply;

a temperature sensor and a pressure sensor in fluid communication with the heating element, the temperature sensor and the pressure sensor configured to measure a temperature and a pressure of the gas as the gas is supplied to the cement slurry;

a flow meter in fluid communication with the heating element, the flow meter configured to measure a flow rate of the gas as the gas is supplied to the cement slurry;

an automated control valve in fluid communication with the gas supply; and a control module including a processing device configured to control a temperature and a flow rate of the gas supplied to the cement slurry based on a desired flow rate and measurements from the temperature sensor, the pressure sensor and the flow meter.

2. The system of claim 1, wherein the gas is nitrogen gas.

3. The system of claim 1, wherein the processing device is configured to control the temperature and the flow rate based on a selected flow rate of the foamed cement slurry and a selected density of the foamed cement slurry.

4. The system of claim 1, wherein the gas is supplied to the gas delivery assembly in a gaseous state by one or more containers configured to retain the gas in the gaseous state at a selected pressure.

5. The system of claim 4, wherein the gas delivery assembly is configured to dynamically heat and choke the gas supplied by the one or more containers to control the temperature, pressure and the flow rate.

6. The system of claim 1, wherein the automated control valve includes a pneumatic valve device coupled to a pneumatic actuator.

7. The system of claim 1, wherein the gas delivery assembly is in fluid communication with a cement slurry foam generating assembly configured to combine the gas with the cement slurry to generate the foamed cement slurry.

8. The system of claim 7, wherein the cement slurry foam generating assembly is configured to receive the cement slurry from a cement slurry pumping assembly, the cement slurry foam generating assembly configured to inject the foamed cement slurry into the borehole.

9. The system of claim 8, wherein at least one of the cement slurry foam generating assembly and the cement slurry pumping assembly is disposed at a respective moveable support structure.

10. The system of claim 1, wherein the support structure is a moveable skid configured to be disposed at a land-based or offshore rig.

11. A method of cementing a borehole with foamed cement, comprising:

receiving a gas at a gas delivery assembly mounted on a movable support structure, the gas delivery assembly including a heating element in thermal communication with a gas supply, a temperature sensor, a pressure sensor, a flow meter, an automated control valve in fluid communication with the gas supply, and a control module, wherein the temperature sensor and the pressure sensor are in fluid communication with the heating element, the temperature sensor and the pressure sensor are configured to measure a temperature and a pressure of the gas as the gas is supplied to the cement slurry, the flow meter is in fluid communication with the heating element, and the flow meter is configured to measure a flow rate of the gas as the gas is supplied to the cement slurry;

controlling a temperature and a flow rate of the gas based on a desired flow rate and measurements from the temperature sensor, the pressure sensor and the flow meter; and outputting the gas according to the temperature and the flow rate to a cement slurry foam generating assembly for generation of a foamed cement slurry.

12. The method of claim 11, further comprising injecting the foamed cement slurry into a borehole.

13. The method of claim 11, wherein the gas is nitrogen gas.

14. The method of claim 11, wherein the temperature and the flow rate is controlled based on a selected flow rate of the foamed cement slurry and a selected density of the foamed cement slurry.

15. The method of claim 11, wherein the gas is supplied to the gas delivery assembly in a gaseous state by one or more containers configured to retain the gas in the gaseous state at a selected pressure.

16. The method of claim 15, wherein controlling the temperature and the flow rate includes dynamically heating and choking the gas supplied by the one or more containers to control the temperature, the pressure and the flow rate.

17. The method of claim 11, wherein the automated control valve includes a pneumatic valve device coupled to a pneumatic actuator.

18. The method of claim 17, wherein the cement slurry foam generating assembly is configured to receive the cement slurry from a cement slurry pumping assembly, the cement slurry foam generating assembly configured to inject the foamed cement slurry into the borehole.

19. The method of claim 18, wherein at least one of the cement slurry foam generating assembly and the cement slurry pumping assembly is disposed at a respective moveable support structure.

20. The method of claim 11, wherein the gas is output to a cement slurry foam generating assembly configured to combine the gas with the cement slurry to generate the foamed cement slurry.

* * * * *